(No Model.) 2 Sheets—Sheet 1.
J. KROOG.
COMBINED FILTER AND CAKE PRESS.
No. 387,594. Patented Aug. 7, 1888.
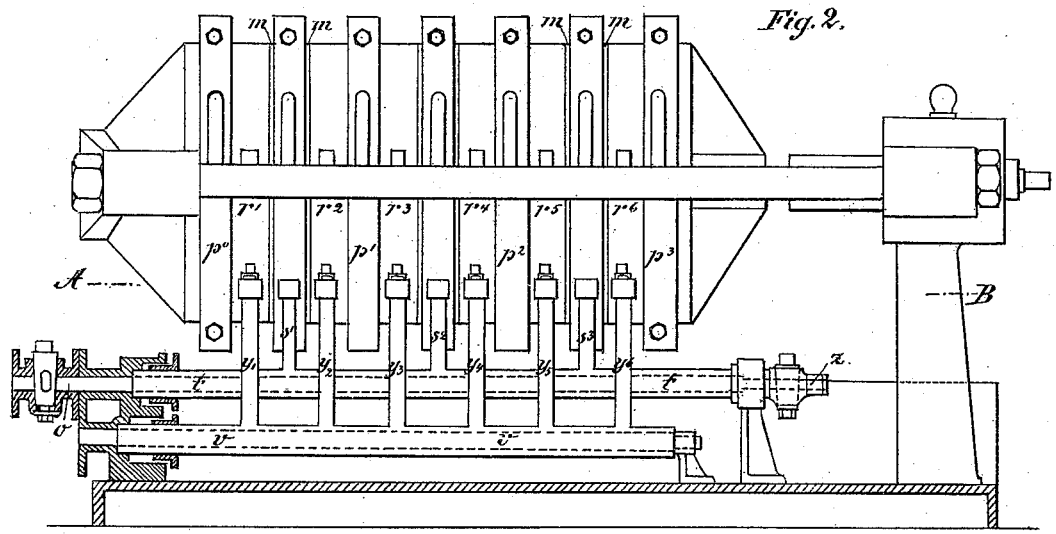
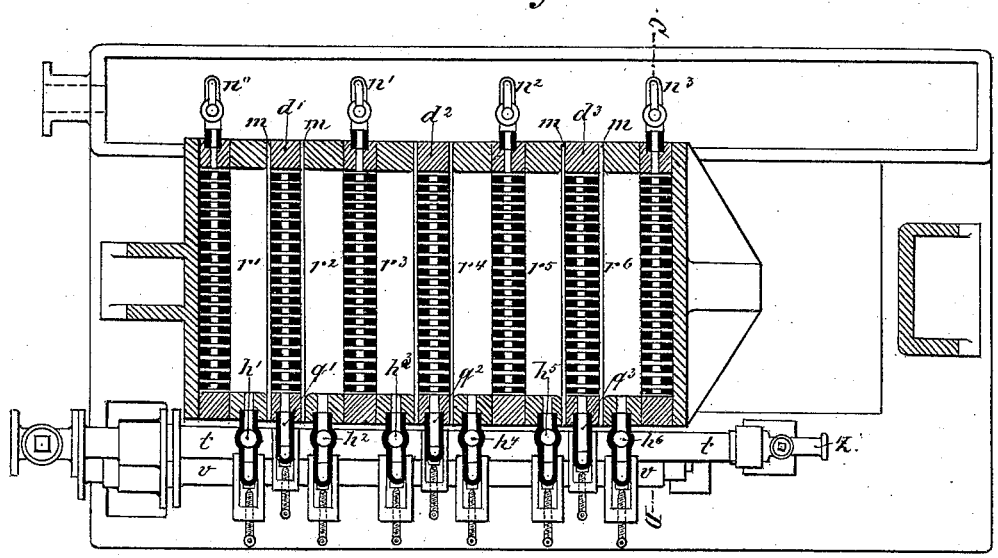
Witnesses:
Percy B. Hills
Robert Emmett
Inventor:
Johann Kroog,
By James L. Norris
Atty.
N. PETERS, Photo-Lithographer, Washington, D.C.

(No Model.) 2 Sheets—Sheet 2.
J. KROOG.
COMBINED FILTER AND CAKE PRESS.
No. 387,594. Patented Aug. 7, 1888.
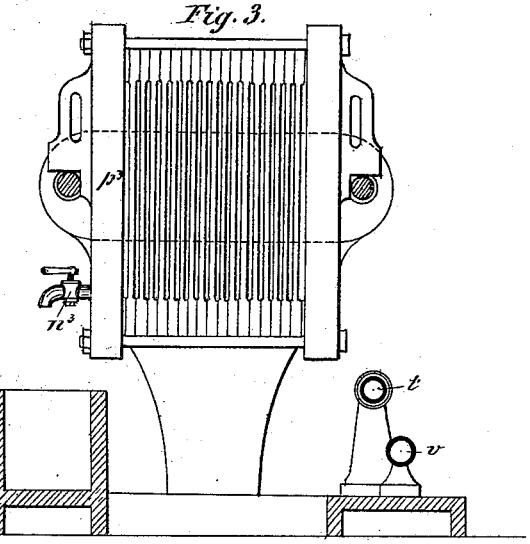
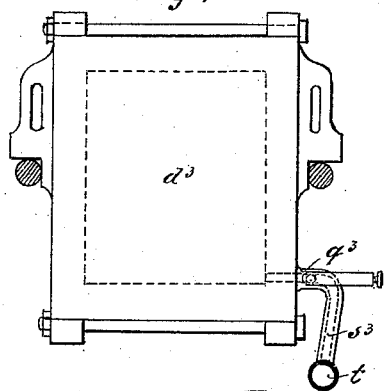
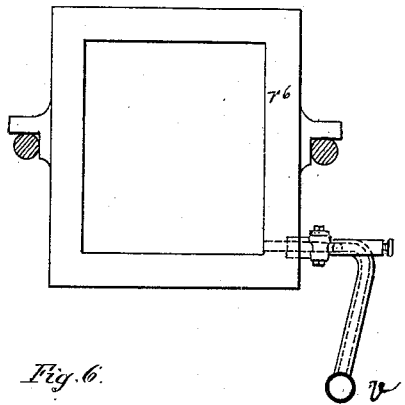
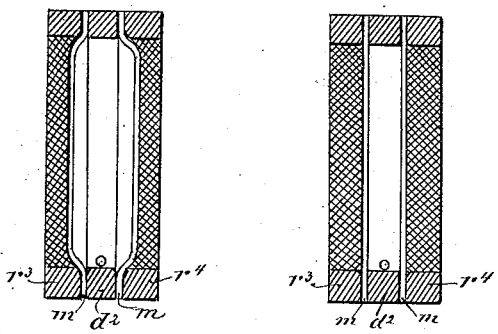
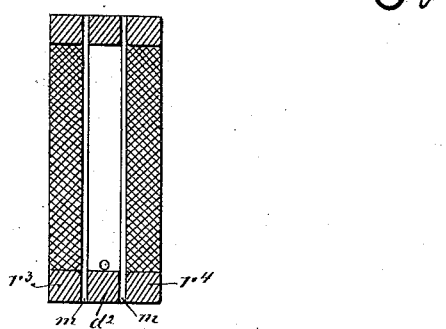
Witnesses.
Percy B. Hills.
Robert Emmett.
Inventor:
Johann Kroog.
By James L. Norris.
Atty.

United States Patent Office.

JOHANN KROOG, OF HALLE-ON-THE-SAALE, PRUSSIA, GERMANY.

COMBINED FILTER AND CAKE PRESS.

SPECIFICATION forming part of Letters Patent No. 387,594, dated August 7, 1888.

Application filed March 22, 1887. Serial No. 231,973. (No model.) Patented in Germany November 8, 1879, No. 12,344; in England December 5, 1879, No. 4,995, and in Austria-Hungary July 25, 1880, No. 39,148 and No. 1,949.

*To all whom it may concern:*

Be it known that I, JOHANN KROOG, of the city of Halle-on-the-Saale, in the Kingdom of Prussia and German Empire, have invented a certain new and useful Improvement in a Combined Filter and Cake Press, (for which I have obtained a patent in Germany, bearing date November 8, 1879, No. 12,344; in Great Britain, bearing date December 5, 1879, No. 4,995, and in Austria-Hungary, bearing date July 25, 1880, No. 39,148 and No. 1,949,) of which the following is a specification, reference being had to the accompanying drawings, and to the letters of reference marked thereon.

This invention relates to improvements in a combined filter and cake press, by means of which the cakes forming in the filtering apparatus during the process of filtration are freed from the fluid remaining in the pores or porous parts of the same. These cakes always contain a more or less considerable quantity of the filtered fluid.

The object of this invention is to provide novel means for removing or abstracting this fluid, and for obtaining very dry cakes by compressing them within the filtering apparatus itself. This object I accomplish by the features of construction and combination of devices hereinafter described and claimed, reference being made to the accompanying drawings, in which—

Figure 1 is a horizontal section on the line A B, Fig. 2, showing a combined filter and cake press provided with my new contrivance for compressing. Fig. 2 is an elevation, partly in section, of the said filter and press. Fig. 3 is a vertical section on the line C D, Fig. 1. Fig. 4 shows a pressing-plate, $d^3$, and its connections with a pressure-pipe, $t$. Fig. 5 shows a frame, $r^6$, and its connections with an inlet or feeding pipe, $v$. Fig. 6 illustrates in vertical section two cakes not yet compressed, with a pressing-plate, $d^2$, between them; and Fig. 7 illustrates, also in vertical section, the same cakes in their compressed state.

The combined filter and press of six chambers, as illustrated in the accompanying drawings, and provided with my said contrivance for compressing, contains, in addition to the plates $p^0$, $p^1$, $p^2$, and $p^3$, to be used for the purpose of filtration, other plates or apparatus, $d^1$, $d^2$, and $d^3$, serving for the purpose of compressing.

The first-named plates I shall herein term "filtering-plates," and the last-mentioned plates "pressing-plates."

I form each of the said pressing-plates $d^1$, $d^2$, and $d^3$ by providing both sides of a filtering-plate, preferably constructed as described in the specification of former Letters Patent granted to me August 17, 1880, No. 231,335, with a perfectly impervious and elastic membrane or covering, $m$. Depending upon the character of the fluid to be filtered, this covering is made either of undulating or corrugated sheet metal or of india-rubber, skins, or some impervious texture of vegetable or animal origin. For the purpose of holding these independent membranes or diaphragms in place, their edges are clamped between the sides of the pressing-plates and the cake-forming frames, as clearly shown in Figs. 6 and 7.

The filtering-plates $p^0$, $p^1$, $p^2$, and $p^3$ are provided with discharge-cocks $n^0$, $n^1$, $n^2$, and $n^3$.

The pressing-plates have no cocks. They are connected with the pressure-pipe $t$ by means of the small pipes $q^1$, $q^2$, and $q^3$ and the elbows $s^1$, $s^2$, and $s^3$, the pressure-pipe $t$ being provided at one of its ends with the pressure-discharge cock $z$, while its other end terminates in a stuffing-box, the latter being provided with the pressure inlet-cock $o$. This pressure-cock $o$ establishes the connection with a pressure-reservoir, which may be filled either with compressed gases or with fluids kept under pressure, or the pressure may be obtained by means of a pump. The frames $r^1$, $r^2$, $r^3$, $r^4$, $r^5$, and $r^6$, serving for the reception and formation of the cakes, can be shut off from the inlet-pipe $v$ for the mass to be filtered by means of the cocks $h^1$, $h^2$, $h^3$, $h^4$, $h^5$, and $h^6$. The connection of these cocks with the inlet-pipe is formed in the same manner as is the connection with the pressure-pipe $t$—that is to say, by means of the elbows $y^1$, $y^2$, $y^3$, $y^4$, $y^5$, and $y^6$.

According to my present invention, each frame intended for receiving a cake is arranged between a filtering-plate and a pressing-plate—that is to say, in such a manner that each frame with an odd number has a filtering-plate on its left hand and a membrane or covering on its right hand, while each frame with an even number has a filtering-plate on its right and a membrane or covering on its left-hand side.

The interior corners of the frames are rounded off at that side which is turned toward the membranes or coverings.

The filtering-press provided with my said compressing contrivance, as above described, is used as follows—that is to say, after the filtering-plates, the frames, and the pressing-plates have been inserted in accurate succession and have been screwed tightly together, the substance to be filtered enters the frames $r^1$, $r^2$, $r^3$, $r^4$, $r^5$, and $r^6$ from the pipe $v$ through the opened cocks $h^1$, $h^2$, $h^3$, $h^4$, $h^5$, and $h^6$. The fluid parts of the substance flow from here through the filtering plates and through the cocks into the trough below, while the solid parts remaining behind will form the cakes. When the latter are ready, the cocks $h^1$, $h^2$, $h^3$, $h^4$, $h^5$, and $h^6$ are closed. Thereupon the cock $o$ of the pressure pipe $t$ is opened, and the pressure from the pressure reservoir at once enters the pressing-plates $d^1$, $d^2$, and $d^3$ and presses the membranes or coverings $m$ tightly against the adjoining cakes, whereby the latter are compressed, and the fluid which remained in the pores of the same during the process of filtration is compelled to leave the pores and to pass out through the filtering-plates. The degree to which the compression may be exerted is dependent on the pressure applied.

Fig. 6 shows the position of the membranes or coverings $m$ before the compression, while Fig. 7 shows the same after compression has taken place. As the cakes (indicated in Fig. 7 by cross-lines) occupy only about half the original space, it is obvious that the cake contained about fifty per cent. of moisture before the compression. After the compression is finished to the desired extent, the cock $o$ is closed, and the pressure contained in the plates is allowed to escape through the cock $z$. The apparatus is then emptied in the usual manner.

I am aware that flexible bags have been arranged to press disks against the cakes in a combined filter and press, as in Letters Patent No. 270,807, and such, therefore, I disclaim.

Having thus described my invention, what I claim as new, and desire to secure by Letters Patent, is—

In a combined filter and press, the combination of a series of cake-forming frames, a pressing-plate between each pair of said frames, independent flexible diaphragms at the opposite sides of each pressing-plate, and having their edges clamped between the sides of the cake-forming frames and said pressing-plates and to rest directly against the cakes to be compressed, the pipe $v$, having branches connected with the cake-forming frames, and the fluid-pressure pipe $t$, having branches connected with the pressing-plates between their independent diaphragms, substantially as described.

In testimony whereof I have signed my name to this specification in the presence of two subscribing witnesses.

JOHANN KROOG.

Witnesses:
  A. D'HEUREUSE,
  EMIL WOLF.